US012793040B1

(12) United States Patent
Jairam et al.

(10) Patent No.: US 12,793,040 B1
(45) Date of Patent: Nov. 10, 2026

(54) TRANSACTION ANALYSIS SYSTEM FOR IDENTIFYING DISCRIMINATION

(71) Applicant: MASTERCARD INTERNATIONAL INCORPORATED, Purchase, NY (US)

(72) Inventors: Akash Jairam, Chesterfield, MO (US); Maksym Shlapak, Richmond Heights, MO (US); Saivenkat Chowdary Vunnam, O'Fallon, MO (US); Thomas Zemen, Lake Saint Louis, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 19/258,888

(22) Filed: Jul. 2, 2025

Related U.S. Application Data

(60) Provisional application No. 63/667,659, filed on Jul. 3, 2024.

(51) Int. Cl.
*G06Q 20/34* (2012.01)
*G06Q 20/40* (2012.01)

(52) U.S. Cl.
CPC ........... *G06Q 20/341* (2013.01); *G06Q 20/40* (2013.01)

(58) Field of Classification Search
CPC ............................ G06Q 20/341; G06Q 20/40
See application file for complete search history.

(56) References Cited

U.S. PATENT DOCUMENTS

| | | | |
|---|---|---|---|
| 11,256,989 B2 | 2/2022 | Dalli et al. | |
| 2021/0056569 A1 | 2/2021 | Silberman et al. | |
| 2022/0114399 A1 | 4/2022 | Castiglione et al. | |
| 2022/0164877 A1 | 5/2022 | Kamkar et al. | |

OTHER PUBLICATIONS

N. Zadafiya, J. Karasariya, P. Kanani and A. Nayak, "Detecting Credit Card Frauds Using Isolation Forest And Local Outlier Factor—Analytical Insights," 2022 4th International Conference on Smart Systems and Inventive Technology (ICSSIT), Tirunelveli, India, 2022, pp. 1588-1594 (Year: 2022).*

Shehkar, et al. "FairOD: Fairness-aware Outlier Detection", arXiv:2012.03063, https://doi.org/10.48550/arXiv.2012.03063 (Year: 2021).*

(Continued)

*Primary Examiner* — Matthew Mikels
(74) *Attorney, Agent, or Firm* — Barta Jones, PLLC

(57) ABSTRACT

A method for identifying discrimination in payment card transactions includes training a machine learning model using training data, the training data including a plurality of completed payment card transactions, the machine learning model being configured to receive, as input, transaction details for an input transaction and generate, as output, an anomalous score indicating whether the input transaction is an outlier transaction relative to a first demographic feature, identifying a first payment card transaction, inputting the first payment card transaction to the machine learning model, identifying, as an output of the machine learning model, that the first payment card transaction is an outlier transaction, and generating a report identifying the first payment card transaction as an instance of discrimination.

17 Claims, 10 Drawing Sheets

(56) References Cited

OTHER PUBLICATIONS

Lu, Guangli, "How Machine Learning Mitigates Racial Bias in the U.S. Housing Market," available at https://ssrn.com/abstract=3489519, Nov. 15, 2019, 74 pages.
Yanisky-Ravid, et al., "Equality and Privacy by Design": A New Model of Artificial Intelligence Data Transparency via Auditing, Certification, and Safe Harbor Regimes, 46 Fordham Urb. L.J. 428, available at: https://ir.lawnet.fordham.edu/cgi/viewcontent.cgi?article=2759&context=ulj, 2019, 60 pages.
Li, Gen, "Chinese Overseas Buyers in U.S. Housing Markets," available at: https://ssrn.com/abstract=4445791, Sep. 9, 2021, 45 pages.
U.S. Government Accountability Office, "Consumer Protection: Gender-Related Price Differences for Goods and Servies", GAO-18-500, Published at: https://www.gao.gov/products/gao-18-500, Aug. 9, 2018, 59 pages.
Human Rights Watch, "Racial Discrimination in the United States," published at: https://www.hrw.org/report/2022/08/08/racial-discrimination-united-states/human-rights-watch/aclu-joint-submission, Aug. 8, 2022, 98 pages.

* cited by examiner

600

John Doe
Cardholder Services

Merchant
Merchant Address

Subject: Transaction Analysis Report

Dear Merchant

I trust this letter finds you well. We are writing to inform you that a new transaction analysis report is available. To view the report, please visit the following link https://
602 transaction-analysis.<CardholderServices>.com/merchant-name-id.

If you have any questions, please don't hesitate to email me at John.Doe@<CardholderServices>.com.

Sincerely,
John Doe
Cardholder Services

FIG. 6

TRANSACTION ANALYSIS SYSTEM FOR IDENTIFYING DISCRIMINATION

BACKGROUND

Technical problems can arise due to biases embedded in data structures, model architectures, or system configurations. For example, machine learning models trained on historical data may assign different pricing tiers, service levels, or product visibility based on inferred or declared attributes such as gender, age, race, or other protected characteristics. Pricing engines, recommendation algorithms, and targeted advertising platforms may then exhibit differential treatment of users, manifesting for example as pricing disparities, restricted access to offers, or unequal credit terms. This represents a technical problem in the design, training, and deployment of consumer-facing systems.

SUMMARY

Some examples provide an analytics system for identifying discrimination in payment card transactions, the analytics system comprising: a historical transactions database storing payment card transaction data for completed payment card transactions; at least one processor; and at least one memory comprising computer-readable instructions, the at least one processor, the at least one memory and the computer-readable instructions configured to cause the at least one processor to: train a machine learning model using training data, the training data including a plurality of completed payment card transactions from the historical transactions database, the machine learning model being an Isolation Forest model that is configured, after the training, to determine whether an input transaction is an outlier transaction relative to a first demographic feature; identify a first payment card transaction; input the first payment card transaction to the machine learning model; identify, as an output of the machine learning model, that the first payment card transaction is an outlier transaction; and generate a report identifying the first payment card transaction as an instance of discrimination.

Some examples provide a computer-implemented method for identifying discrimination in payment card transactions, the method comprising: training a machine learning model using training data, the training data including a plurality of completed payment card transactions, the machine learning model being configured receive, as input, transaction details for an input transaction and generate, as output, an anomalous score indicating whether the input transaction is an outlier transaction relative to a first demographic feature; identifying a first payment card transaction; inputting the first payment card transaction to the machine learning model; identifying, as an output of the machine learning model, that the first payment card transaction is an outlier transaction; and generating a report identifying the first payment card transaction as an instance of discrimination.

Some examples provide a computer storage medium having computer-executable instructions that, upon execution by a processor of a computer, cause the processor to at least: train a machine learning model using training data, the training data including a plurality of completed payment card transactions from a historical transactions database, the machine learning model being an Isolation Forest model that is configured, after the training, to determine whether an input transaction is an outlier transaction relative to a first demographic feature; identify a first payment card transaction; input the first payment card transaction to the machine learning model; identify, as an output of the machine learning model, that the first payment card transaction is an outlier transaction; and generate a report identifying the first payment card transaction as an instance of discrimination.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 6 is an example communication that may be sent by the system to a reporting user that opts in for notifications on whether they are possibly discriminating against customers.

Corresponding reference characters indicate corresponding parts throughout the drawings. Any of the figures may be combined into a single example or embodiment.

DETAILED DESCRIPTION

Figure 1:
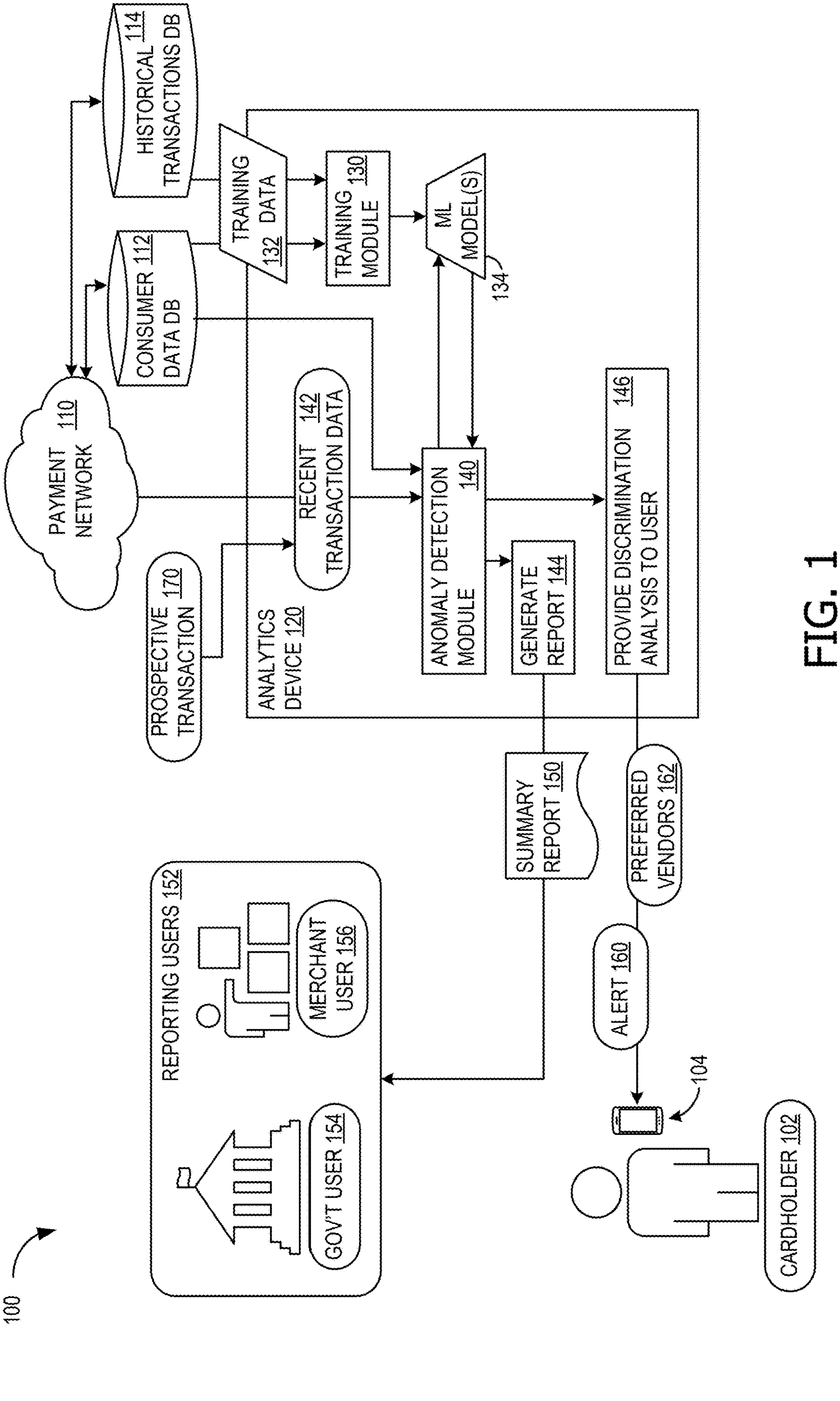
FIG. 1 is an exemplary block diagram illustrating a system for identifying aspects of discrimination based on payment card transactions conducted in a payment network.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . ." For brevity and clarity of presentation, this implied leading clause is not repeated ad nauseum.

Conventional systems for detecting discriminatory practices in payment transactions face several technical challenges. These systems often rely on rule-based approaches or manual audits, which lack the scalability and adaptability needed to analyze large volumes of transaction data in real time. They typically do not incorporate demographic data effectively, making it difficult to identify subtle or systemic patterns of disparate impact across different consumer groups. Additionally, conventional methods struggle to detect complex, non-linear relationships between transaction attributes and demographic factors, limiting their ability to uncover hidden biases. Further, disparities may not be apparent during system design or testing phases, and may only become evident through dynamic system behavior in live environments. These shortcomings result in low sensitivity to nuanced forms of discrimination and an increased likelihood of false positives or missed instances of unfair treatment.

In contrast, the present disclosure provides a computer-implemented method and system configured to detect, quantify, and mitigate discriminatory treatment in automated decision-making pipelines using algorithmic fairness metrics, feedback control loops, and real-time adjustment mechanisms. By implementing this approach within a computing environment, examples of the disclosure provide a practical, technological solution that improves the functioning of computerized consumer-interaction systems, ensures more equitable and consistent treatment across user populations, and goes beyond well-understood, routine, or conventional methods.

For example, an analytics system provides a technical solution that utilizes machine learning, trained on historical transaction data with demographic attributes, to detect anomalous patterns that may indicate disparate impact in payment transactions. By automatically analyzing complex relationships in transaction data, the analytics system overcomes the scalability, sensitivity, and accuracy limitations of conventional rules-based approaches.

During a training phase, the analytics system trains a machine learning model (e.g., an isolation forest) to learn patterns of typical payment card transaction behavior within a payment network. The model is trained on historical transaction data that includes demographic information of the consumers involved, such as race, gender, age, or other protected characteristics. By analyzing these historical transactions, the model identifies a baseline distribution of expected behavior across demographic groups. The training process involves isolating outliers and understanding how transaction attributes correlate with demographic data, thereby enabling the system to establish a statistical norm that reflects equitable treatment in payment processing across diverse consumer segments.

During an operational phase, the trained model is applied to live or recent payment card transactions involving specific merchants. For each evaluated transaction, the model assesses whether the characteristics of the transaction deviate significantly from the established norms learned during training. If anomalous patterns are detected—particularly those that disproportionately affect certain demographic groups—the system flags the transaction as potentially indicative of disparate impact. These flagged transactions may then be further reviewed or used to inform compliance and/or initiate corrective measures. This approach enables continuous, data-driven monitoring of consumer treatment within the payment network, supporting efforts to identify and address potential instances of discrimination.

In some examples, the analytics system includes reporting features that provide actionable insights into potential disparate impact within payment card transactions. One feature enables the analysis of transaction data associated with a specific merchant, generating a report that identifies any patterns of disparate impact across demographic groups, helping to pinpoint potentially discriminatory practices for that merchant. Another feature allows for the evaluation of recent or pending transactions involving individual consumers, assessing whether those transactions deviate from established equitable norms and may reflect disparate treatment. Such capabilities support both merchant-level oversight and consumer-level protection by enabling targeted, data-driven assessments of fairness in financial transactions.

The analytics system described herein provides a technical solution to the technical problem of detecting disparate impact in payment card transactions, a task that conventional computing systems struggle to perform due to technical limitations in scalability, sensitivity, and pattern recognition. By implementing a machine learning model (e.g., an isolation forest) trained on historical transaction and demographic data, the analytics system processes large volumes of data, identifies complex, non-linear anomalies, and generates real-time assessments of potential discriminatory practices. This cannot be done in the human mind, or with pen and paper. This approach is rooted in advanced data processing techniques and provides concrete improvements to the functioning of computer systems used for transaction monitoring and fairness evaluation. As such, the system is a specific and practical application of machine learning technology that enhances the technical capabilities of computing infrastructure to detect and address systemic biases in financial transactions.

The analytics system described herein is described with reference to data monitored and/or collected from users and merchants for analysis. In some examples, prior to the monitoring, collection, and/or analysis, notice is provided to the users and merchants (e.g., via a dialog box or preference setting), and the users and merchants are given the opportunity to give or deny consent for the monitoring, collection, and/or analysis. The consent can take the form of opt-in consent or opt-out consent. The consent is revokable by the users and/or merchants at any time. In this manner, participation in the analytics system is optional, and enrollment occurs only with the informed consent of the users and merchants.

FIG. 1 is an exemplary block diagram illustrating an analytics system 100 for identifying aspects of discrimination based on payment card transactions conducted in a payment network 110. In the example, the analytics system (or just "system") 100 includes an analytics device 120 that is configured to train one or more machine learning models 134 using historical payment card transaction data and to use the trained models 134 to identify potential instances of discrimination in current or recent payment card transactions. In some examples, the system 100 utilizes demographic data about cardholders 102 (e.g., data about race, gender, sex, age, religion, national origin, disability, or the like), and such demographic data or other personal data of the cardholders 102 may be anonymized and/or encrypted to protect the identity of individual cardholders, and may further be aggregated with other users (e.g., over a particular demographic group) to protect the users. In some examples, cardholder 102 and other users may opt into certain functional aspects of the system 100, thus allowing a degree of control over how their data is used.

The term "disparate treatment" or "disparate impact," as used herein, refers to differing treatment of a particular group of consumers, or effect on that group, as compared to other groups (whether as a result of intentional or unintentional behavior (e.g., regardless of intent)). Such disparate treatment, as used herein, excludes "justifiable" (e.g., non-discriminatory) types of disparate treatment such as, for example, risk-based pricing or declines (e.g., charging higher fees or declining transactions based on fraud risk or creditworthiness when tied to objective fraud detection or credit scoring algorithms), card type or issuer rules (e.g., different fees, acceptance rules, or promotions based on card type or issuing bank based on cost to merchant or card network rules), loyalty and customer segmentation (e.g., offering different prices, promotions, or refund policies to repeat customers versus one-time customers, where the treatment is based on customer behavior and not personal identity), certain aspects of geographic pricing (e.g., charging different prices or offering different services by location or region, when such pricing reflects local cost structures and not the demographics of consumers), time-based offers (e.g., discounts or service restrictions tied to time of day, day of week, or season when neutral to personal attributes and applying equally to all), transaction history-based policies (e.g., stricter return/refund policies for customers with high return rates or chargebacks when based on past behavior and not identity), and the like. Such "non-discriminatory" treatment is based on behavior, cost, or risk, and not identity. When disparate treatment is transparent, relevant to business outcomes, and is not correlated with protected characteristics, the disparate treatment is more likely to be non-discriminatory.

In some examples, disparate treatment becomes discriminatory when consumers are treated differently based on a protected characteristic without a legitimate, legal or business justification. This includes both direct use of such attributes (e.g., rejecting a mortgage application based on the race of the applicant) as well as indirect use via a proxy for such attributes (e.g., rejecting mortgage applications based on zip code of the underlying property being in a predominantly-minority area, where zip code can become a proxy for race). Such protected attributes or sensitive attributes include, for example, race, gender, gender identity, religion, age, disability, national origin, and sexual orientation. Disparate treatment becomes discriminatory when treatment of the consumer is based on protected characteristics (directly or indirectly), lacks a valid business rationale, and results in unequal outcomes.

During a training phase, in the example, the analytics device 120 includes a training module 130 that is configured to train one or more machine learning models 134. In some examples, the training module 130 trains one or more ML models 134 that are configured to perform anomaly detection using an isolation forest (e.g., isolation trees (iTrees), to identify outliers or anomalies in transaction data relative to underlying demographic data and transaction data). In some examples, the training module 130 trains one or more ML models using decision trees, such as classifiers or regressors that predict transaction outcomes based on a target variable, which can then be used to perform group fairness checks across various demographic groups via group fairness and counterfactual fairness analysis.

In examples, the training module 130 identifies a set of training data 132 that includes payment card transaction data from a historical transactions database (DB) 114 as well as user data associated with each transaction (e.g., demographic data or other data associated with the cardholders of those historical payment card transactions, from a consumer data DB 112). In some examples, the training module 130 trains the ML model(s) 134 by building multiple decision trees, each of which involves randomly selecting a feature and then randomly selecting a split value between the minimum and maximum values of the selected feature. The points are then isolated by randomly partitioning the data, recursively repeating this process while the data points are separated into smaller and smaller groups. Once these trees are built, they can be used to predict if a new data point is an outlier (e.g., by dropping the point into each tree and measuring how many steps it takes to isolate that point, where fewer steps indicates a greater likelihood to be an outlier).

During an operational phase, an anomaly detection module 140 of the analytics device 120 uses the trained ML models 134 to inspect particular payment card transactions (e.g., recent transaction data 142) for instances of discrimination. In some examples, the analytics device 120 is configured to analyze particular groups of payment card transactions, such as completed payment card transactions filtered by some particular industry, merchant group, merchant, product, or the like, and perhaps filtered by some time period, geographic region, or the like. Such examples are referred to herein as 'group analytics,' as this type of discrimination analysis inspects payment card transactions over that particular group (e.g., as defined by group filter criteria). In some examples, the analytics device 120 is configured to analyze past, current, or prospective transactions of a particular cardholder 102. Such examples are referred to herein as 'cardholder analytics,' as this type of discrimination analysis is performed specifically for an individual cardholder 102. In some examples, the analytics device 120 is configured to analyze transactions of a particular merchant (e.g., merchant user 156). Such examples are referred to herein as 'merchant analytics,' as this type of discriminatory analysis is performed specifically for transactions involving that merchant (e.g., either for discriminatory practices amongst their own consumers, or as compared to the conduct of other merchants).

In group analytics examples, the anomaly detection module 140 identifies a set of recent transaction data 142 based on a particular area of focus for a given study. For example, presume a study is desired to examine discrimination in pricing for a particular consumer product or a family of products, such as adult clothing. As such, the anomaly detection module 140 may identify a set of filters for the study that filters past payment card transactions based on, for example, merchant category code (MCC) (e.g., identifying merchants that sell particular types of products or services, such as 'Men's and Boys' Clothing and Accessories Stores,' 'Women's and Girls' Clothing and Accessories Stores,' or the like), product-level data (e.g., identifying particular types of products purchased during the transaction, such as 'Men's Shirt,' Men's Suit,' 'Women's Blouse,' 'Women's Shoes,' or the like), or for particular merchants or particular merchant locations (e.g., including a merchant list or merchant store list). These study filters may further be refined by geographic region (e.g., including merchants by zip codes, cities, states, regions, or the like), transaction time (e.g., transactions occurring in the second quarter of 2023), transaction types (e.g., debit/credit/gift card transactions, card-present (CP) or card-not-present (CNP) transactions, or the like), or other such transaction data.

In this example, the analytics device 120 applies these study filters to generate the recent transaction data 142 that are used for this particular study. More specifically, the recent transaction data 142 is generated from a query of recent payment card transaction data (e.g., from the historical transactions DB 114) of the payment network 110. This recent transaction data 142 includes both transaction data associated with individual payment card transactions (e.g., as identified based on the study filters) as well as anonymized cardholder data for each cardholder associated with each particular transaction (e.g., demographic data or other such cardholder data).

In this example, the anomaly detection module 140 inputs each of the transactions from the recent transaction data 142 to the ML model 134. For each particular transaction, the ML model 134 identifies whether or not that transaction is an outlier (e.g., an anomaly, perhaps based on a threshold value). The anomaly detection module 140 groups the outlier transactions based on particular types of demographic data. These groupings are then used by the anomaly detection module 140 to identify particular demographic groups that have been subject to particular types of discrimination (e.g., women facing some instances of higher pricing in clothing, minority groups facing some instances of higher pricing in consumer electronics, disabled groups facing a lack of availability to certain services, or the like). In examples, the anomaly detection module 140 generates a summary report 150 at operation 144 that, for example, identifies aggregated data about the particular discrimination identified from the study (e.g., identifying particular demographic classes and the particular types of discrimination identified). These reports 150 may be provided to reporting users 152, such as government users 154 or merchant users 156 (e.g., particular merchants opting into the system 100 to analyze their own practices or tendencies, determine how to be less discriminatory, or such), or to the payment network 110.

In cardholder analytics examples, cardholders 102 may be allowed to opt into participation in aspects of discrimination analytics offered by the system 100 (e.g., for their own knowledge and protection). In examples, the system 100 may allow the cardholder 102 to analyze their past transactions for possible occurrences of discrimination (e.g., historical payment card transactions or recently-completed payment card transactions performed using their own payment cards) or prospective transactions for potential discrimination (e.g., transactions being considered by the cardholder 102 prior to performing or completing the transaction). Such past transaction analysis can help the cardholder 102 identify how they may have been subject to discrimination (e.g., allowing the cardholder 102 to understand where they may be at some financial risk). Such prospective transaction analysis can help the cardholder 102 avoid discrimination prior to purchase (e.g., helping the cardholder 102 to steer prospective transactions to merchants with fairer outcomes).

In some examples, in evaluating past transactions for occurrences of discrimination, the anomaly detection module 140 identifies a set of payment card transactions of the cardholder 102 (e.g., based on primary account number (PAN) of their payment card(s)), and perhaps limited by one or more custom filters (e.g., based on timeframe, particular types of transactions, particular types of merchants, or the like). For example, the cardholder 102 may initiate a personal analysis that inspects all of their transactions occurring within the past year. As such, the anomaly detection module 140 queries the historical transaction DB 114 for transactions of the cardholder 102 having occurred in the last 365 days (e.g., thus defining the recent transaction data 142 for this personal analysis). The anomaly detection module 140 thus inputs each of these transactions to the ML model(s) 134 to identify anomalies amongst their own transactions. Each anomalous transaction, so identified, represents a potential occurrence of discrimination against the cardholder 102, under some particular demographic (e.g., based on age, based on race, based on religion, or the like), and as to some particular discriminatory form (e.g., pricing discrimination, service quality discrimination, product availability discrimination, or the like).

In the example, the anomaly detection module 140 provides a discrimination analysis output to the user (e.g., the cardholder 102) at operation 146 (e.g., viewed via a personal computing device of the cardholder 102, such as mobile computing device 104). In some examples, the analysis output includes a summary report sent to the cardholder 102 (e.g., similar to the summary report 150, perhaps identifying particular transactions, particular demographics implicated, particular forms of discrimination, and the like). In some examples, the cardholder 102 may configure the system 100 to perform a personal analysis of individual transactions as they occur (e.g., during authorization of, or shortly after completion of, a particular transaction). In such examples, the anomaly detection module 140 may detect that the current or recent transaction is anomalous in some respect and, as such, may transmit an alert message 160 to the cardholder 102.

In evaluating prospective transactions for potential discrimination, the cardholder 102 may identify a prospective transaction 170 to the analytics device 120, or the payment network 110 may perform anomaly detection on the prospective transaction 170 during payment authorization (e.g., allowing the cardholder 102 to approve or reject the transaction after viewing the output of the analysis). This prospective transaction 170 represents a transaction that has not yet occurred, but that is being considered by the cardholder 102. This prospective transaction 170 may identify prospective transaction details such as a particular product, product type, service, or service type being considered for purchase, particular merchants being considered, a prospective sale price, or other such transaction details. As such, the anomaly detection module 140 uses this prospective transaction 170 and associated details in lieu of the recent transaction data 142, similarly evaluating the prospective transaction 170 using the ML models 134 to identify whether or not the prospective transaction 170 appears to be an outlier. In some examples, this prospective transaction analysis may identify whether and how the prospective transaction 170 is anomalous (e.g., the particular demographic, the particular form of discrimination). In some examples, the anomaly detection module 140 may provide a list of preferred vendors 162 for the prospective transaction (e.g., based on identification of opted-in merchant users 156 for which the prospective transaction 170 would not be anomalous, based on particular product or service pricing from those merchant users 156 for the particular product/service, or for merchant users 156 which have minimal anomalies based on current data and some static or dynamic threshold). As such, the system 100 may help the cardholder 102 to proactively avoid discrimination.

Figure 2:
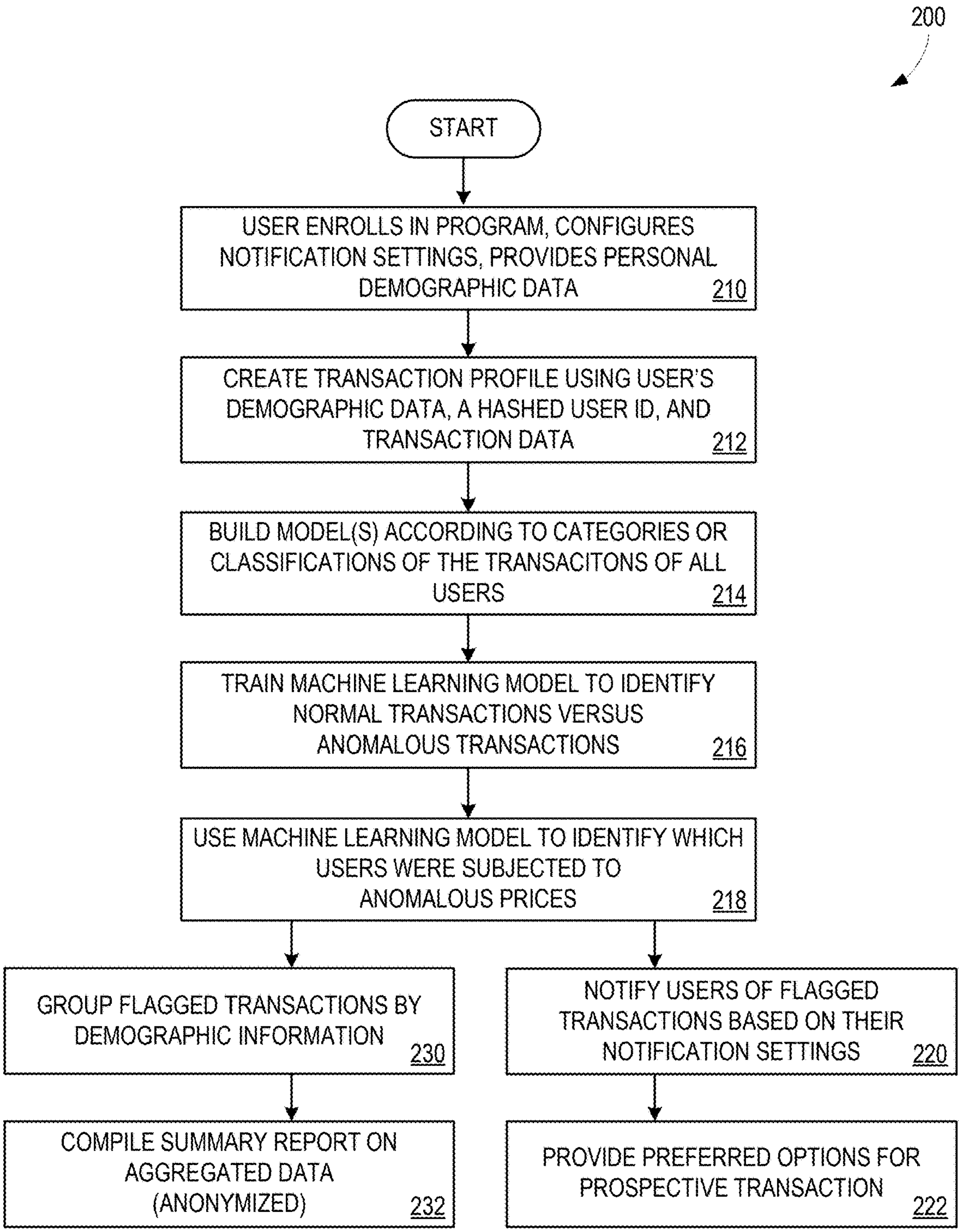
FIG. 2 is a flowchart of an exemplary method for analyzing payment card transactions for potential occurrences of discrimination.

FIG. 2 is a flowchart of an exemplary method 200 for analyzing payment card transactions for potential occurrences of discrimination. In some examples, the method 200 is performed by the analytics device 120 of the system 100 shown in FIG. 1. In the example, the analytics device 120 asks the user (e.g., the cardholder 102) for permission to enroll in a discrimination analytics program and allows the user to configure notification settings, provide personal demographic data, and the like, at operation 210. Such program configuration settings can include, for example, identifying when personal analytics are performed on their payment card transactions, what types of transactions are analyzed, how the system 100 provides analytics output to the user, and the like. At operation 212, the analytics device 120 creates a transaction profile using the demographic data of the user, anonymizing the identification of the user (e.g., via a hash of a user ID), and transaction data.

At operation 214, the analytics device 120 builds one or more models (e.g., ML models 134) according to one or more categories or classifications of payment card transactions for a set of users (e.g., using training data 132 from the historical transactions DB 114). The analytics device 120 trains the ML models 134 to identify normal transactions versus anomalous transactions at operation 216. At operation 218, the analytics device 120 uses the ML models 134 to identify which users were subjected to discrimination (e.g., to anomalous prices). In some examples, the analytics device 120 groups flagged transactions by demographic information at operation 230 and compiles a summary report (e.g., summary report 150) on the anonymized, aggregated data at operation 232. In some examples, the analytics device 120 notifies users of flagged transactions based on their notification settings at operation 220 and may provide preferred transaction options (e.g., an alternate merchant) for prospective transactions at operation 222.

Figure 3:
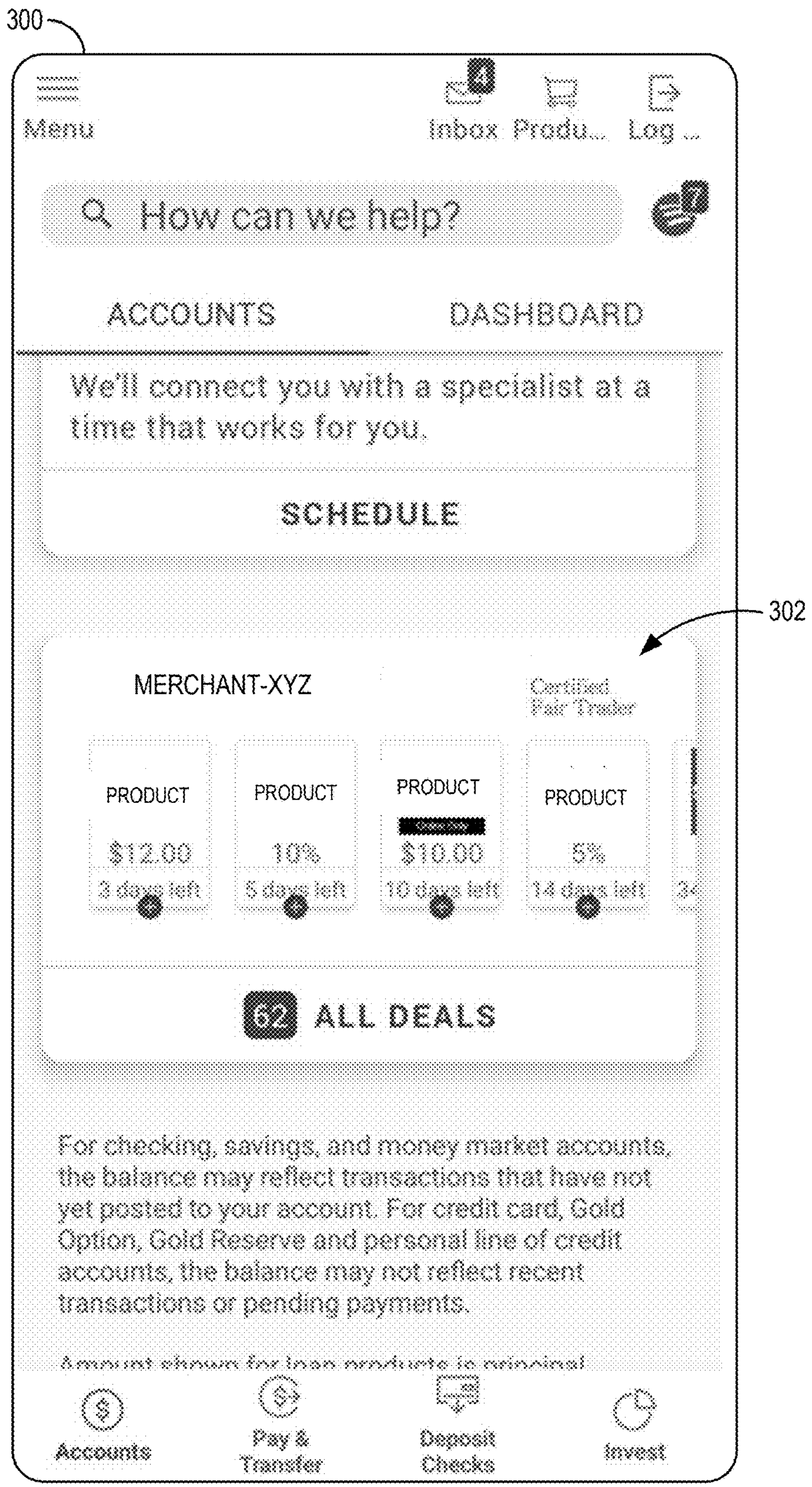
FIG. 3 is a screenshot of an example graphical user interface that presents merchant certification data generated by the analytics device of FIG. 1.

FIG. 3 is a screenshot of an example graphical user interface 300 that presents merchant certification data generated by the analytics device 120 of FIG. 1. In examples, the user interface 300 is displayed to cardholders 102 as a part of a cardholder account management application (e.g., via mobile computing device 104). Here, an "accounts" tab displays product offerings (e.g., "deals") from a particular merchant (e.g., "merchant-XYZ"). Merchants that have developed a reputation for treating customers fairly (e.g., via analytics performed by the system 100) will be labeled as "certified fair traders" when offers are presented to cardholders 102. In this example, merchant-XYZ is marked 302 as a certified fair trader.

Figure 4:
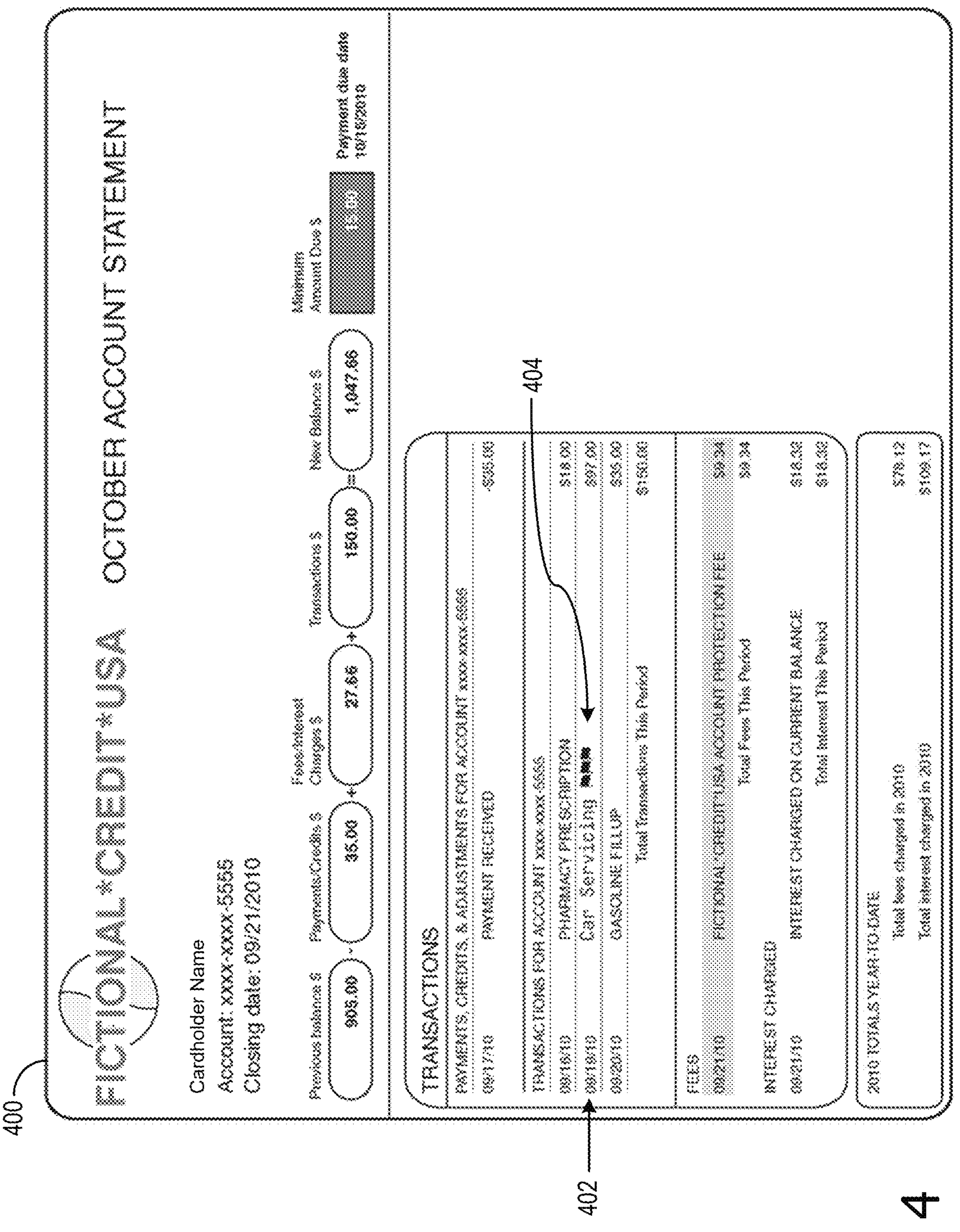
FIG. 4 is an example credit card statement for a cardholder in which merchant analytics data generated by the system of FIG. 1 is shown.

FIG. 4 is an example credit card statement 400 for a cardholder 102 in which merchant analytics data generated by the system 100 of FIG. 1 is shown. In the example, transactions 402 which are identified as anomalous by the analytics device 120 are flagged on the statement 400 with flags 404, thereby allowing the cardholder 102 to consider alternate merchants for similar products or services in the future.

Figure 5:
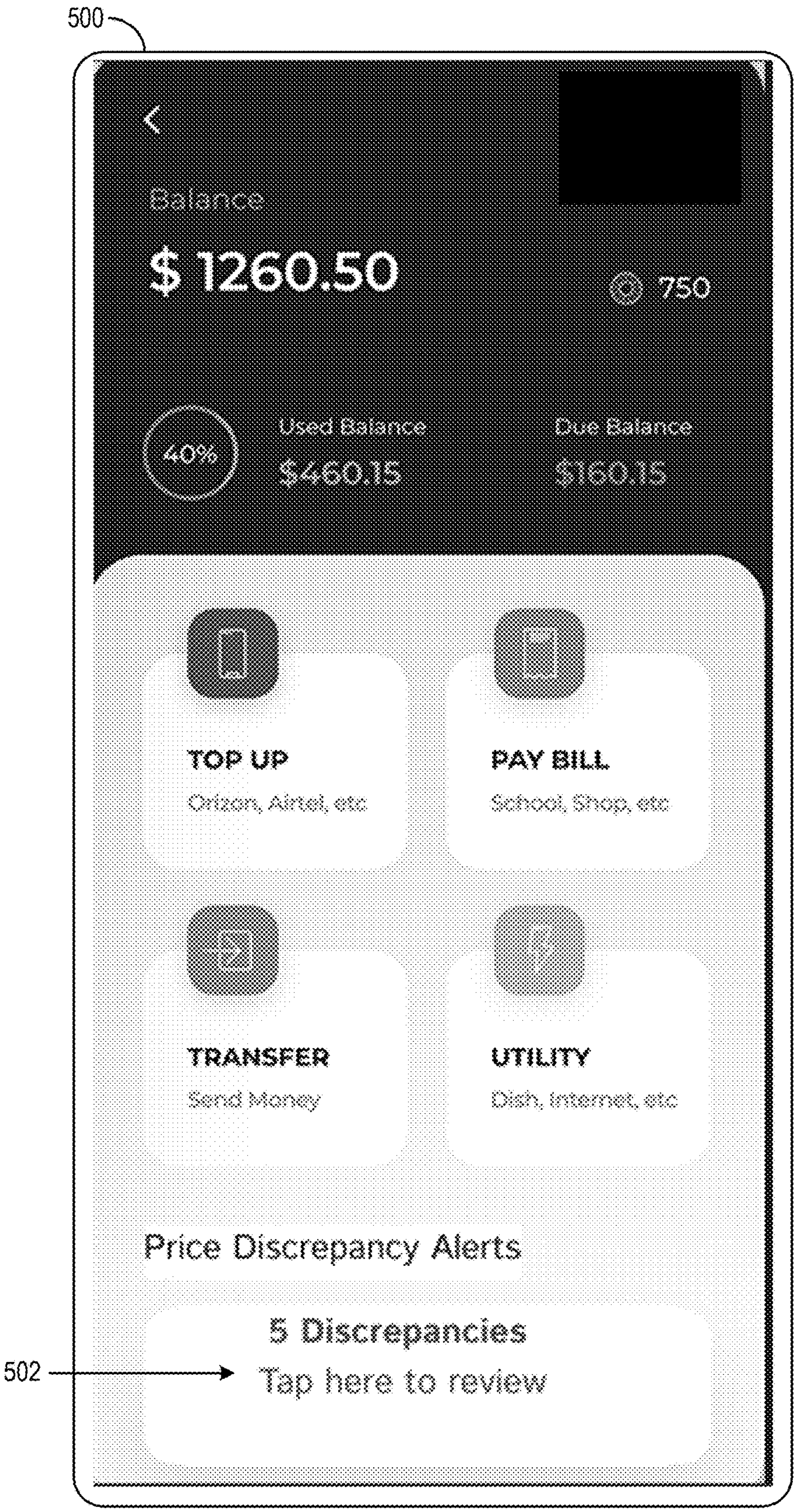
FIG. 5 is a screenshot of an example graphical user interface that presents anomalous transaction data generated by the analytics device of FIG. 1.

FIG. 5 is a screenshot of an example graphical user interface 500 that presents anomalous transaction data generated by the analytics device 120 of FIG. 1. In examples, the user interface 500 is displayed to cardholders 102 as a part of a cardholder account management application (e.g., via mobile computing device 104). Here, the user interface 500 displays a discrepancy notification 502 to the cardholder 102 when one or more anomalous transactions are identified by the analytics device 120. In addition to notifications such as text messages or other such push notifications, cardholders 102 can view anomalous transactions via the user interface 500. Upon clicking the discrepancy notification 502, the user interface 500 displays transaction details for the anomalous transactions, thereby allowing the cardholder 102 to view the particular merchant and transaction that are flagged as anomalous.

FIG. 6 is an example communication 600 that may be sent by the system 100 to a reporting user 152 that opts in for notifications on whether they are possibly discriminating against customers. In the example, when the analytics device 120 detects that a particular merchant may be discriminating against cardholders 102, the system 100 generates the communication 600 to alert the merchant that there is a summary report 150 available for viewing. The communication 600 may have a secure link 602 that the reporting user 152 can use to view the summary report 150.

Figure 7:
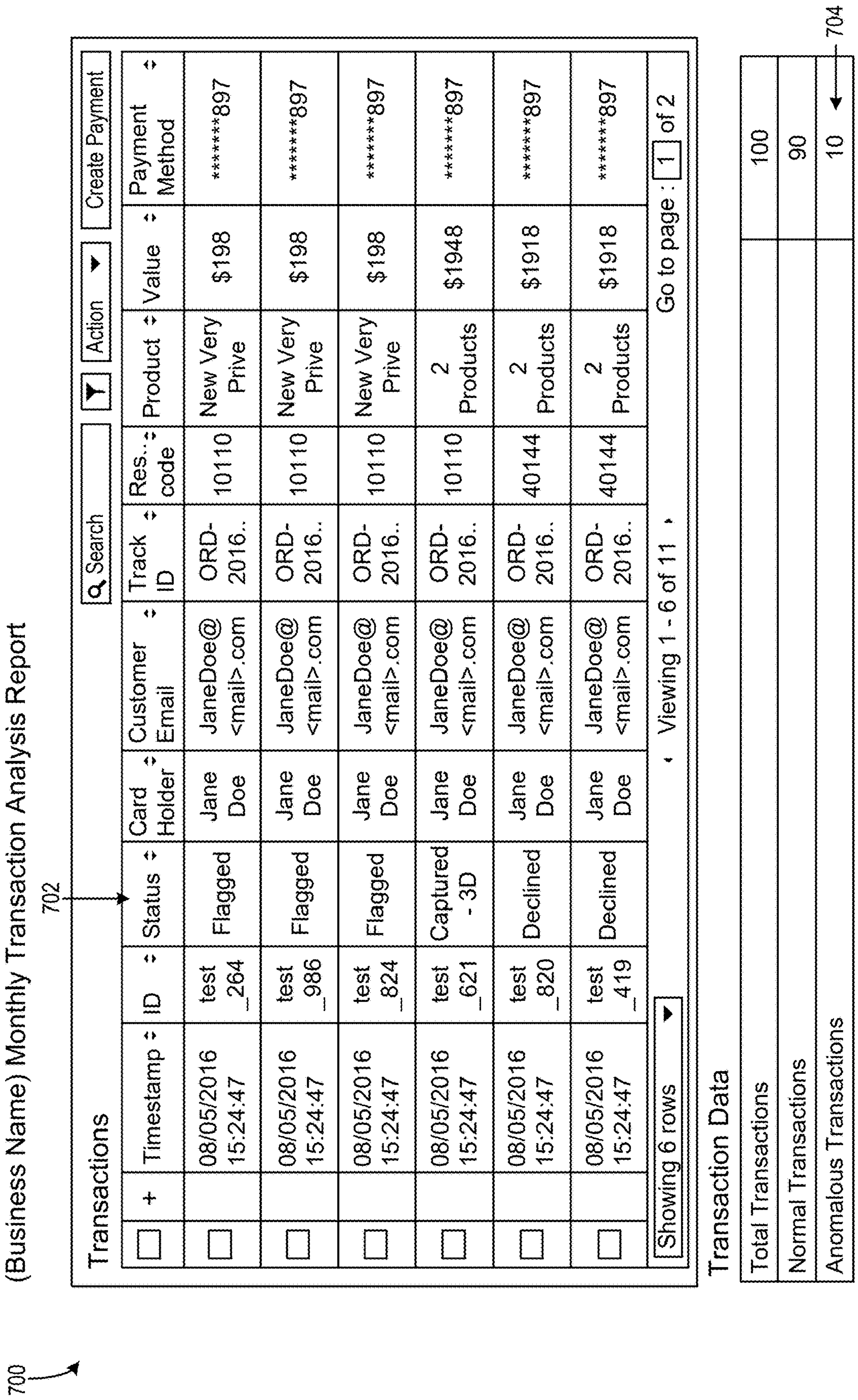
FIG. 7 is an example web page that shows transaction details for cardholder transactions that includes flagged transactions identified by the analytics device.

FIG. 7 is an example web page 700 that shows transaction details for cardholder transactions that includes flagged transactions identified by the analytics device 120. The web page 700 may be an example summary report 150 shown to reporting users 152 or to cardholders 102. In the example, anomalous transactions are flagged in a status column 702 and a total number of anomalous transactions 704 are displayed in a summary section.

Figure 8:
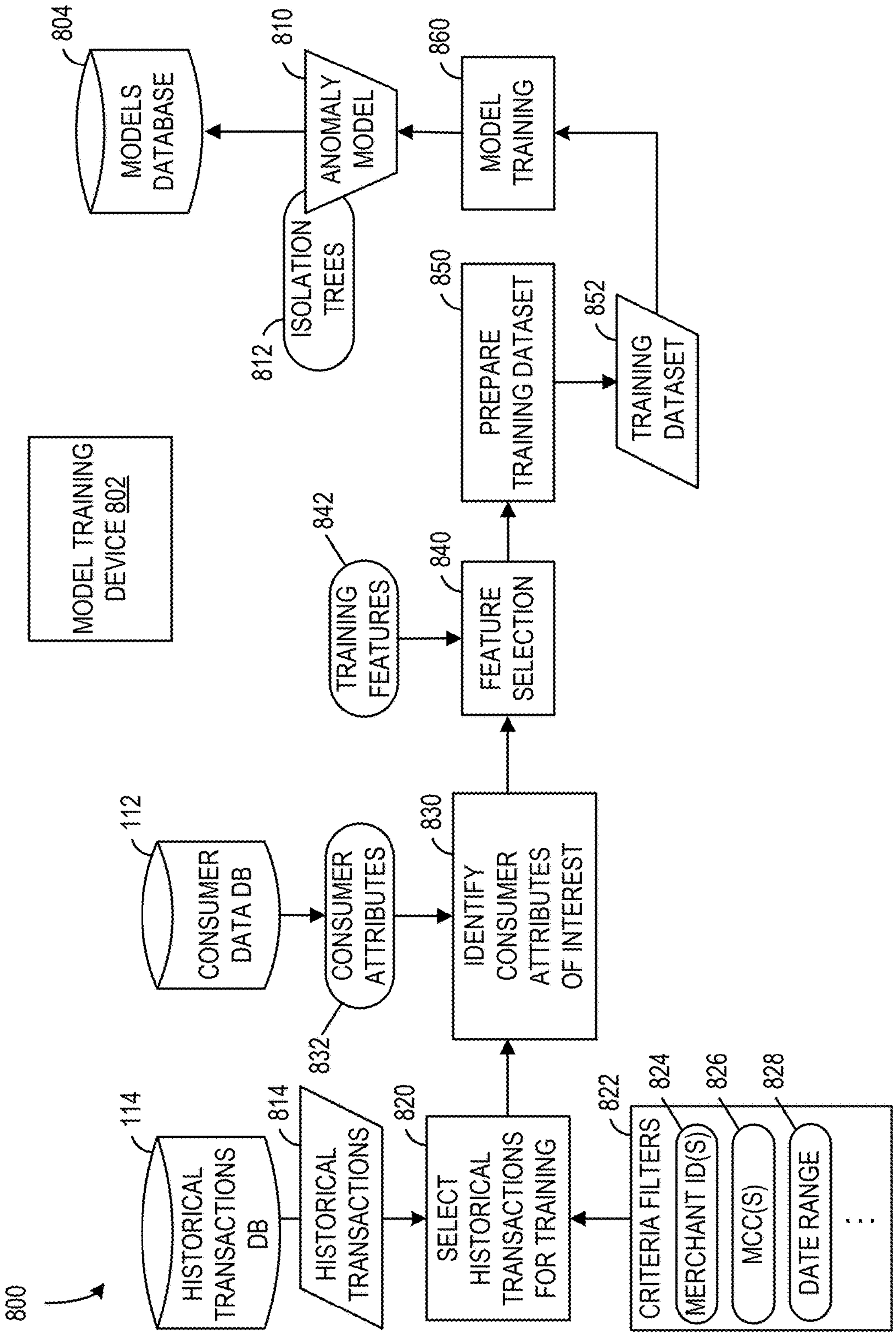
FIG. 8 is a flow chart and data flow diagram that illustrates details regarding model training for example anomaly models.

FIG. 8 is a flow chart and data flow diagram 800 that illustrates details regarding model training, for example anomaly models 810. In some examples, the model training shown in FIG. 8 is similar to the model training by the training module 130 of FIG. 1. In the example, a device such as a model training device 802 trains one or more anomaly models 810. Such models 810 may be similar to the ML models 134 shown in FIG. 1, and thus are configured to identify disparate impact in payment transactions relative to various user attributes (e.g., protected demographic classes).

In examples, the anomaly model 810 is trained as an isolation forest-type machine learning model (unsupervised) that is configured to identify anomalies in payment transactions. More specifically, during model training for the anomaly model 810, the model training device 802 identifies a set of criteria filters 822 to be used for this specific anomaly model 810. Criteria filters 822, in the example, represent filters that are used to identify which particular historical transactions from the historical transactions DB 114 are used to train this anomaly model 810. The criteria filters 822 can include, for example, one or more merchant IDs 824 (e.g., identifying particular merchants), one or more merchant category codes (MCCs) 826, and/or a date range 828, or any transaction criteria (e.g., geographic region) or consumer attribute criteria (e.g., demographic attributes). Criteria filters 822 can include any combination of these criteria, as well as perhaps multiple criteria of each type (e.g., multiple merchant IDs 824, multiple MCCs 826, multiple date ranges 228).

More specifically, at operation 820, the model training device 802 selects historical transactions 814 to be used for training this particular anomaly model 810 based on the criteria filters 822 identified for this model 810 (e.g., as selection criteria from historical transactions DB 114). Some such data may be referred to herein as "environmental context," such as merchant ID, acquirer ID, issuer ID, terminal ID, cardholder number, and/or region, and such data may be used as criteria filters 822 during model training. Each of the selected historical transactions 814, in the example, is presumed to include various "transaction features" or "transaction details" (e.g., data fields or data components) associated with the historical transaction. These transaction features are used as a superset of what can be used as training features 842 during the model training, as discussed in further detail below.

"Transaction features" include, for example, transaction ID (e.g., a unique identifier for the transaction), transaction amount (e.g., monetary value of the transaction), currency type (e.g., ISO currency code), transaction type (e.g., purchase, refund, ATM withdrawal, and so forth), transaction date/time (e.g., timestamp of the transaction), transaction day-of-week and transaction hour (e.g., extracted from datetime, for patterns), transaction channel (e.g., in-person, online, mobile, contactless, and so forth), approval status (e.g., approved, declined, referred, and so forth), authorization code, response code, decline reason code (e.g., if declined, provides reason), cardholder ID (e.g., pseudonymized, unique ID for the consumer), card type (e.g., debit, credit, prepaid), card brand (e.g., particular payment network), and card issuing bank. Further, in examples, transaction features also include merchant information such as merchant ID (e.g., uniquely identifying a particular merchant), merchant name (e.g., optional, possibly anonymized), MCC (e.g., category, such as groceries, electronics, or the like), merchant country (e.g., ISO country code), merchant region (e.g., regional location, state, province, jurisdiction), merchant zip code, and merchant terminal ID, as well as possibly historical context features such as merchant approval rate for this merchant (e.g., percent of transactions approved at merchant level) or historical approval rates by demographic (e.g., by race, gender, or the like, for this merchant). In addition, in examples, transaction features also include context features for the object(s) purchased via the transaction. For example, for the purchase of a house, the location, size, and type (or other such features) can be used to eliminate false positives and more accurately identify anomalies. Without such context, anomalies could be flagged between purchases of smaller houses and the purchase of a large estate or mansion. Similarly, transaction metadata such as company, transaction location, customer age, and customer gender can likewise be used as context.

At operation 830, the model training device 802 populates each of the historical transactions 814 with consumer data of the consumer involved in that historical transaction 814. More specifically, in the example, the model training device 802 identifies a set of consumer attributes 832 of interest for this anomaly model 810. In examples, consumer attributes 832 include one or more demographic classes, such as race, ethnicity, gender, age or date of birth, religion, disability, sexual orientation, or national origin. For each of the historical transactions 814, the model training device 802 identifies the consumer associated with that transaction 814 (e.g., via pseudonymized cardholder ID), then retrieves consumer data from the consumer data DB 112 for each of the consumer attributes 832 identified for this model training. As such, once populated, each historical transaction 814 also includes the consumer data of interest for that transaction 814.

At operation 840, the model training device 802 performs feature selection on the historical transactions 814. Feature selection includes building a training dataset 852 to be used during model training of operation 860 by selecting which particular fields of the historical transactions 814 will be used for training. More specifically, the model training device 802 builds the training dataset 852 to include all the historical transactions 814 selected at operation 820, but only includes the fields identified by training features 842. As such, the training features 842 are a list of fields that are included in the training dataset 852, where other fields are excluded for the purposes of model training of operation 860. In examples, the training features 842 include any of the transaction features of the historical transactions 814, as described above, as well as any or all of the consumer attributes 832 described above. As such, the historical transactions 814 are effectively pruned down to include just the training features 842 of those transactions 814, thereby resulting in the training dataset 852.

In the example, at operation 850, the model training device 802 prepares the training dataset 852. Dataset preparation includes, for example, ensuring data integrity by handling missing values (e.g., drop transactions or impute), removing duplicates, or filtering out invalid transactions (e.g., transactions with negative amounts implausible timestamps, or the like). Further, isolation forest-type models work with numerical input. As such, dataset preparation also includes ordinal encoding for features with a meaningful order (e.g., risk level), use of one-hot encoding or frequency encoding for nominal features such as MCC, country or region. In some examples, dataset preparation includes scaling of some features. Isolation Forest is generally scale-invariant, since it uses splits and not distances, but standardizing or normalizing (e.g., via min-max scaling, Z-score standardization, or the like) can help when there are extreme outliers in numeric ranges or when comparing scores across features or models. In some examples, dataset preparation includes creating derived features to better represent behavior, such as time since last transaction, frequency of similar transactions (e.g., same MCC in past 24 hours), ratio of amount to user's average, location mismatch with cardholder address, or the like. Further, in the example, the dataset preparation includes assembling a numeric matrix (an "input matrix") for the training dataset 852 in which each row is a historical transaction 814 and each column is one of the training features 842.

At operation 860, in the example, the model training device 802 performs model training to train the specific anomaly model 810 using this training dataset 852. In this example, the anomaly model 810 is trained as an isolation forest-type model, training numerous trees (isolation trees, or iTrees) on various subsets of the training dataset 852. Each node in a given iTree contains a split feature (e.g., price), a split value (e.g., average price charged), and left and right pointers to child nodes. The nodes with path lengths from the root that are below or above average will refer to the anomalous transactions, which may possibly reflect discrimination. While the example uses isolation trees, other examples can use regression models with a similar feature set, and to similar effect.

For example, model training of operation 860 includes sampling subsets of the data to train each tree (a "sampling size", e.g., 256 points per tree). The model training device 802 identifies a set of model parameters for the anomaly model 810, including n_estimators (e.g., the number of trees 812 in the forest, 100 to 300 trees), max_samples (e.g., number of samples to draw to train each tree), max_features (e.g., number of features to use per tree), contamination (e.g., estimated proportion of outliers, used to define anomaly score threshold), and random_state (e.g., for reproducibility).

In the example, for each of the n_estimator trees, the model training device 802 randomly selects max_samples points from the training dataset 852 and then recursively partitions the space by: randomly selecting a feature 842, randomly choosing a split value between its min and max, and creating branches until the instance is isolated, the tree reaches max_depth, or the node has only one instance. The result is a forest of isolation trees, each reflecting a random partitioning of the feature space.

Once the isolation trees 812 are built, each training transaction 814 in the training dataset 852 is passed through each tree. For each tree, its path length (e.g., number of splits needed to isolate it) is stored. The average path length across all trees becomes the basis for computing an anomaly score for that transaction 814. The model 810 assigns each instance an anomaly score based on the average path length (e.g., shorter path length being more anomalous), where the final score is normalized between 0 (normal) and 1 (highly anomalous) using a theoretical baseline for average path length. A decision threshold is defined to decide above what point is considered anomalous. If the contamination parameter is set, the model 810 automatically sets a threshold. Otherwise, this decision threshold is a configurable parameter.

Once trained, the anomaly model 810 is stored in the models database 804 for use during an operational phase.

During the operational phase, in some examples, the anomaly model 810 is put to use evaluating a new transaction (e.g., by the anomaly detection module 140 using recent transaction data 142 as shown in FIG. 1). More specifically, the recent transaction data 142 for a given transaction or set of new transactions is prepared similar to the training dataset 852. Namely, the anomaly detection module 140 identifies the transaction features for the new transaction (e.g., the same fields used for the historical transactions 814 during training), identifies the consumer attributes 832 for the consumer associated with that new transaction (e.g., similar to operation 830), limits the features of the new transaction to just the training features 842 used for this anomaly model 810 (e.g., similar to operation 840), and prepares the new transaction data similar to operation 850. In other words, the new transaction data includes the same features, same encoding for categorical variables, same scaling, and such, as the training dataset 852 used to train the anomaly model 810.

Accordingly, once the new transaction data is prepared, each new transaction is input into the anomaly model 810, thereby causing the model 810 to output an anomaly score between 0 (normal) and 1 (highly anomalous). This score represents how "unusual" the transaction is compared to the patterns learned during training. As such, the anomaly detection module 140 thus compares each anomaly score to a decision threshold (e.g., >0.8→anomalous) or a set of thresholds (e.g., <0.4→very typical, 0.4 to 0.6→somewhat unusual, 0.6 to 0.8→possibly anomalous, >0.8→likely anomalous/discriminatory).

To identify possible discriminatory behavior, the anomaly detection module 140 collects anomaly scores across different demographic groups (e.g., by race, gender, nationality) and analyzes distributional differences. For example, the anomaly detection module 140 analyzes whether certain groups are more often flagged as anomalous, and whether legitimate transactions from protected groups have higher anomaly scores. In some examples, the anomaly detection module 140 uses Boxplots or histograms of scores per group, performs statistical testing (e.g., KIS test, t-test) to compare score distributions, or performs fairness metrics like disparate impact ratio. For each transaction flagged as anomalous, in examples, the anomaly detection module 140 logs the transaction with metadata generated during the analysis (e.g., anomaly score, and the like) and optionally escalates the transaction for human review (e.g., compliance or ethics teams, merchant report generation for merchant review, consumer reporting, or the like).

Figure 9:
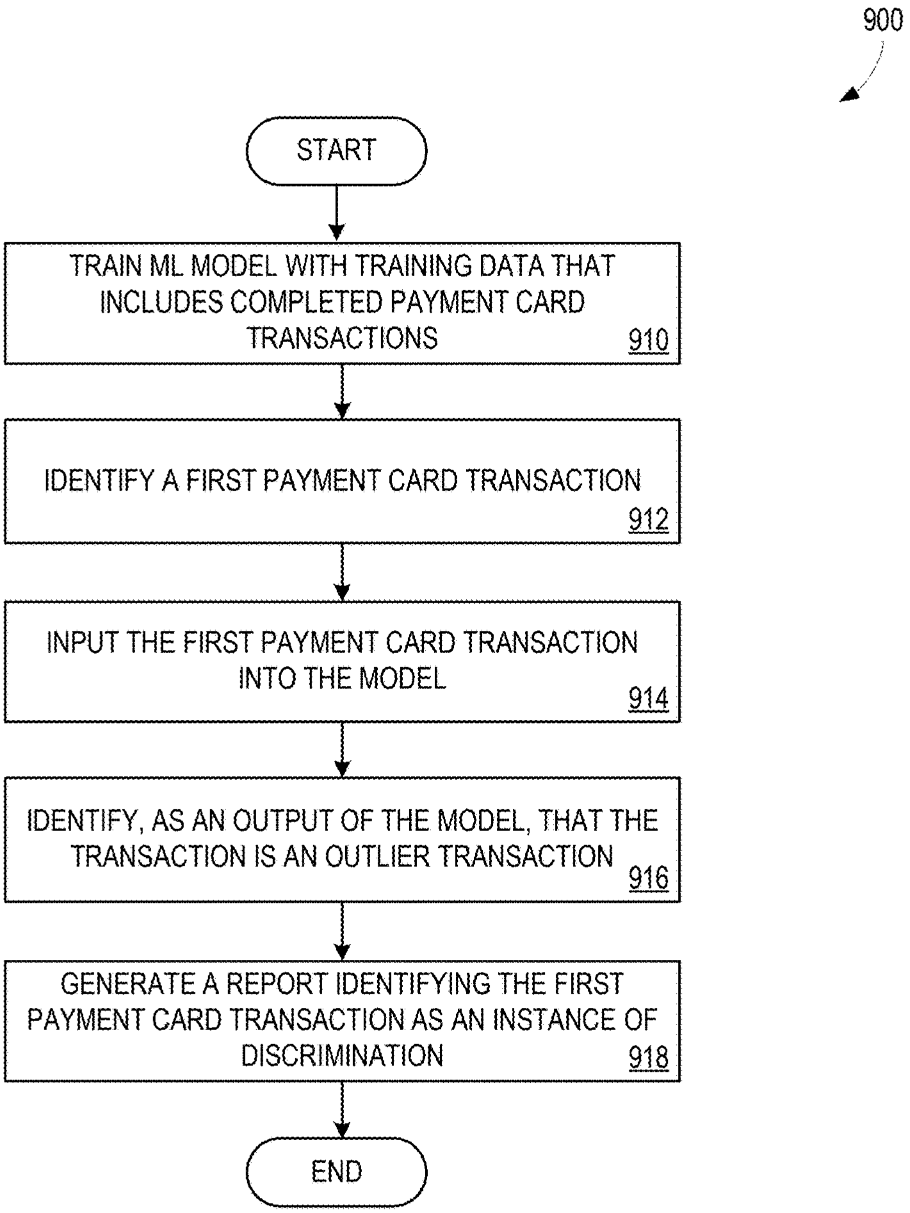
FIG. 9 is a flowchart of an example method for identifying discrimination in payment card transactions.

FIG. 9 is a flowchart of an example method 900 for identifying discrimination in payment card transactions. In some examples, the method 900 is performed by one or more of the analytics device 120 and the model training device 802 within the analytics system 100 of FIG. 1, and may include any of the operations described in FIG. 1 through FIG. 8. In the example, at operation 910, the analytics device 120 trains a machine learning model (e.g., ML model 134, anomaly model 810) using training data (e.g., training dataset 852), the training data including a plurality of completed payment card transactions (e.g., historical transactions 814), the machine learning model being configured receive, as input, transaction details for an input transaction and generate, as output, an anomalous score indicating whether the input transaction is an outlier transaction relative to a first demographic feature.

At operation 912, in the example, the analytics device 120 identifies a first payment card transaction (e.g., during an operational phase). At operation 914, the analytics device 120 inputs the first payment card transaction to the machine learning model. At operation 916, the analytics device 120 identifies, as an output of the machine learning model, that the first payment card transaction is an outlier transaction. At operation 918, the analytics device 120 generates a report identifying the first payment card transaction as an instance of discrimination. In some examples, generating the report further includes causing to be displayed, to a consumer via a user interface, an alert indicator identifying a merchant associated with the first payment card transaction as historically exhibiting disparate treatment in payment card transactions.

In some examples, the analytics device 120 also receives a plurality of completed payment card transactions involving a first merchant, and applies each completed payment card transaction of the plurality of completed payment card transactions as inputs to the machine learning model, thereby generating a score for each completed payment card transaction, wherein generating the report includes: identifying one or more anomalous transactions from the plurality of completed payment card transactions based on the scores; and reporting each anomalous transaction of the one or more anomalous transactions as exhibiting disparate impact based on a particular demographic attribute.

In some examples, the analytics device 120 also causes to be displayed, to a consumer via a mobile user interface, a merchant certification indicator identifying the merchant as a fair merchant when the plurality of completed payment card transactions exhibit an anomalous transaction level below a predetermined threshold.

In some examples, the first payment card transaction is a pending payment card transaction awaiting approval of a consumer to proceed, the report is displayed to the consumer after the consumer initiates the first payment card transaction and before a transaction request is sent to an issuer, and the analytics device 120 also: receives, based on input from the consumer, a request to cancel the first payment card transaction, and terminates the first payment card transaction before submitting the first payment card transaction to the issuer for authorization.

In some examples, training the machine learning model further includes: selecting the plurality of completed payment card transactions from a historical transactions database based on at least one criteria filter; and for each completed payment card transaction in the plurality of completed payment card transactions: identifying a consumer associated with the completed payment card transaction; and retrieving one or more demographic attributes of the consumer. In some examples, training the machine learning model further includes: selecting a plurality of training features for the training, the plurality of training features including a plurality of transaction data components and at least one demographic attribute; generating a training dataset matrix, wherein each row of the training dataset matrix represents a completed payment card transaction of the plurality of completed payment card transactions, wherein each column of the training dataset matrix represents one of the training features of the plurality of training features, wherein each cell in the training dataset matrix is populated with a value of an associated training feature and an associated completed payment card transaction; and training the machine learning model based on the training dataset matrix.

Exemplary Operating Environment

Figure 10:
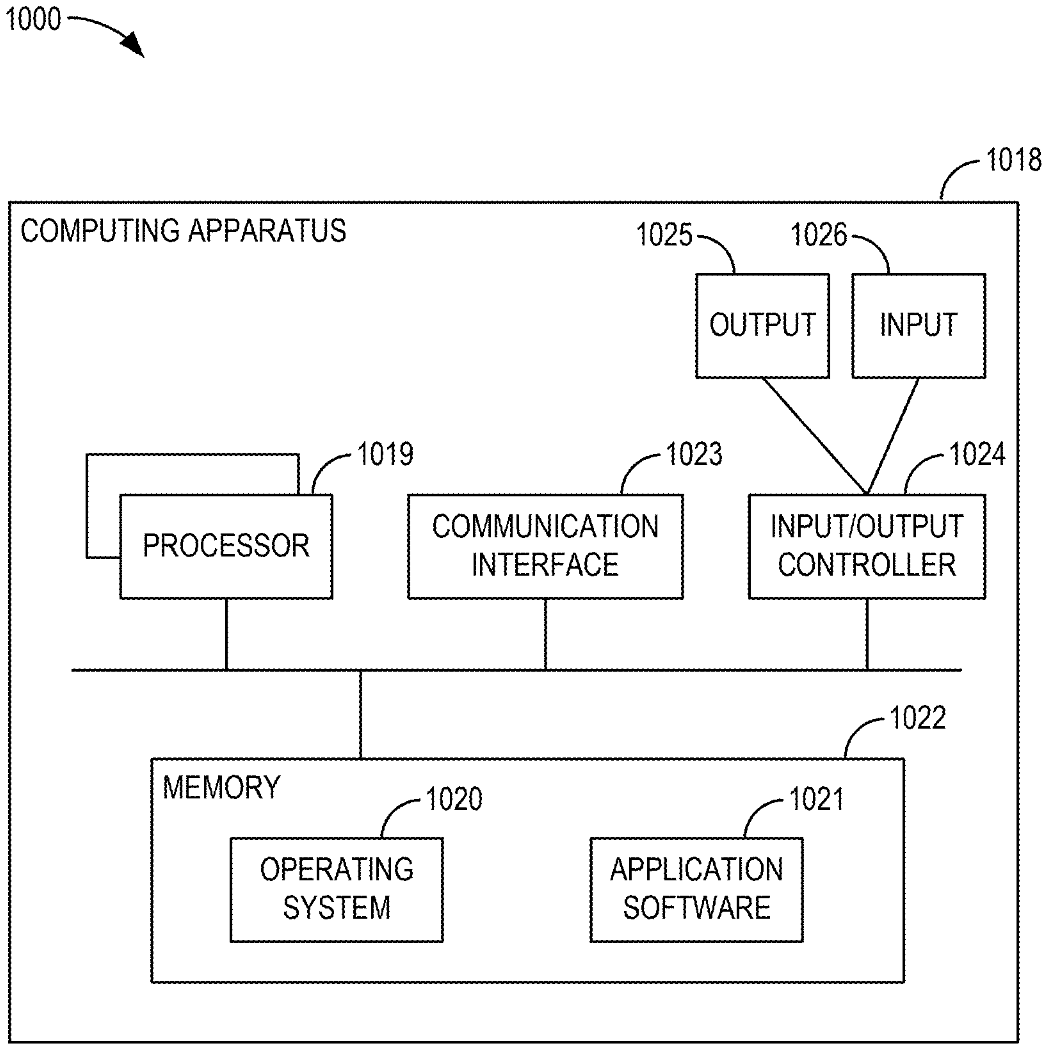
FIG. 10 is a functional block diagram of a computing apparatus according to an embodiment.

The present disclosure is operable with a computing apparatus according to an embodiment as a functional block diagram 1000 in FIG. 10. In an example, components of a computing apparatus 1018 are implemented as a part of an electronic device according to one or more embodiments described in this specification. The computing apparatus 1018 is a computing device, such as, but not limited to, the mobile computing device 104, the analytics device 120, the consumer data DB 112, or the historical transactions DB 114 in FIG. 1 or the model training device 802 of FIG. 8.

The computing apparatus 1018 comprises one or more processors 1019 which can be microprocessors, controllers, or any other suitable type of processors for processing computer executable instructions to control the operation of the electronic device. Alternatively, or in addition, the processor 1019 is any technology capable of executing logic or instructions, such as a hardcoded machine. In some examples, platform software comprising an operating system 1020 or any other suitable platform software is provided on the apparatus 1018 to enable application software 1021 to be executed on the device.

In some examples, computer executable instructions are provided using any computer-readable medium or media accessible by the computing apparatus 1018. Computer-readable media include, for example, computer storage media such as a memory 1022 and communications media. Computer storage media, such as a memory 1022, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium does not include a propagating signal. Propagated signals per se are not examples of computer storage media. Although the computer storage medium (the memory 1022) is shown within the computing apparatus 1018, it will be appreciated by a person skilled in the art, that, in some examples, the storage is distributed or located remotely and accessed via a network or other communication link (e.g., using a communication interface 1023).

Further, in some examples, the computing apparatus 1018 comprises an input/output controller 1024 configured to output information to one or more output devices 1025, for example a display or a speaker, which are separate from or integral to the electronic device. Additionally, or alternatively, the input/output controller 1024 is configured to receive and process an input from one or more input devices 1026, for example, a keyboard, a microphone, or a touchpad. In one example, the output device 1025 also acts as the input device. An example of such a device is a touch sensitive display. The input/output controller 1024 in other examples outputs data to devices other than the output device, e.g., a locally connected printing device. In some examples, a user provides input to the input device(s) 1026 and/or receives output from the output device(s) 1025.

The functionality described herein can be performed, at least in part, by one or more hardware logic components. The computing apparatus 1018 is configured by the program code when executed by the processor 1019 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

ADDITIONAL EXAMPLES

In some examples, an analytics system for identifying discrimination in payment card transactions is provided. The analytics system includes: a historical transactions database storing payment card transaction data for completed payment card transactions; at least one processor; and at least one memory comprising computer-readable instructions, the at least one processor, the at least one memory and the computer-readable instructions configured to cause the at least one processor to: train a machine learning model using training data, the training data including a plurality of completed payment card transactions from the historical transactions database, the machine learning model being an Isolation Forest model that is configured, after the training, to determine whether an input transaction is an outlier transaction relative to a first demographic feature; identify a first payment card transaction; input the first payment card transaction to the machine learning model; identify, as an output of the machine learning model, that the first payment card transaction is an outlier transaction; and generate a report identifying the first payment card transaction as an instance of discrimination.

In some examples, a computer-implemented method for identifying discrimination in payment card transactions is provided. The method includes: training a machine learning model using training data, the training data including a plurality of completed payment card transactions, the machine learning model being configured receive, as input, transaction details for an input transaction and generate, as output, an anomalous score indicating whether the input transaction is an outlier transaction relative to a first demographic feature; identifying a first payment card transaction; inputting the first payment card transaction to the machine learning model; identifying, as an output of the machine learning model, that the first payment card transaction is an outlier transaction; and generating a report identifying the first payment card transaction as an instance of discrimination.

In some examples, a computer storage medium having computer-executable instructions is provided. The computer-executable instructions, upon execution by a processor of a computer, cause the processor to at least: train a machine learning model using training data, the training data including a plurality of completed payment card transactions from a historical transactions database, the machine learning model being an Isolation Forest model that is configured, after the training, to determine whether an input transaction is an outlier transaction relative to a first demographic feature; identify a first payment card transaction; input the first payment card transaction to the machine learning model; identify, as an output of the machine learning model, that the first payment card transaction is an outlier transaction; and generate a report identifying the first payment card transaction as an instance of discrimination.

Alternatively, or in addition to the other examples described herein, examples include any combination of the following:

a historical transactions database storing payment card transaction data for completed payment card transactions;

train a machine learning model using training data;

the training data including a plurality of completed payment card transactions from the historical transactions database;

the machine learning model being an Isolation Forest model;

the machine learning model that is configured, after the training, to determine whether an input transaction is an outlier transaction relative to a first demographic feature;

identify a first payment card transaction;

input the first payment card transaction to the machine learning model;

identify, as an output of the machine learning model, that the first payment card transaction is an outlier transaction;

generate a report identifying the first payment card transaction as an instance of discrimination;

retrieve, from the historical transactions database, a plurality of completed payment card transactions involving a first merchant;

apply each completed payment card transaction of the plurality of completed payment card transactions as inputs to the machine learning model, thereby generating a score for each completed payment card transaction;

identifying one or more anomalous transactions from the plurality of completed payment card transactions based on the scores;

reporting each anomalous transaction of the one or more anomalous transactions as exhibiting disparate impact based on a particular demographic attribute;

cause to be displayed, to a consumer via a mobile user interface, a merchant certification indicator identifying the merchant as a fair merchant when the plurality of completed payment card transactions exhibit an anomalous transaction level below a predetermined threshold;

causing to be displayed, to a consumer via a user interface, an alert indicator identifying a merchant associated with the first payment card transaction as historically exhibiting disparate treatment in payment card transactions;

the first payment card transaction is a pending payment card transaction awaiting approval of a consumer to proceed;

the report is displayed to the consumer after the consumer initiates the first payment card transaction and before a transaction request is sent to an issuer;

receive, based on input from the consumer, a request to cancel the first payment card transaction;

terminate the first payment card transaction before submitting the first payment card transaction to the issuer for authorization;

selecting the plurality of completed payment card transactions from the historical transactions database based on at least one criteria filter;

for each completed payment card transaction in the plurality of completed payment card transactions, identifying a consumer associated with the completed payment card transaction; and retrieving one or more demographic attributes of the consumer;

selecting a plurality of training features for the training, the plurality of training features including a plurality of transaction data components and at least one demographic attribute;

generating a training dataset matrix, wherein each row of the training dataset matrix represents a completed payment card transaction of the plurality of completed payment card transactions, wherein each column of the training dataset matrix represents one of the training features of the plurality of training features, wherein each cell in the training dataset matrix is populated with a value of an associated training feature and an associated completed payment card transaction;

training the machine learning model based on the training dataset matrix;

training a machine learning model using training data;

the training data including a plurality of completed payment card transactions;

the machine learning model being configured receive, as input, transaction details for an input transaction;

the machine learning model being configured generate, as output, an anomalous score indicating whether the input transaction is an outlier transaction relative to a first demographic feature;

identifying a first payment card transaction;

inputting the first payment card transaction to the machine learning model; and identifying, as an output of the machine learning model, that the first payment card transaction is an outlier transaction.

Any range or device value given herein may be extended or altered without losing the effect sought, as will be apparent to the skilled person.

Examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent can take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

In some examples, the operations illustrated in FIG. 1 to FIG. 8 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Within the scope of this application, it is expressly intended that the various aspects, embodiments, examples, and alternatives set out in the preceding paragraphs, in the claims and/or in the description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim, accordingly, including the right to amend any originally filed claim to depend from and/or incorporate any feature of any other claim although not originally claimed in that manner.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. An analytics system for identifying discrimination in payment card transactions, the analytics system comprising:

a historical transactions database storing payment card transaction data for completed payment card transactions;

at least one processor; and at least one memory comprising computer-readable instructions, the at least one processor, the at least one memory and the computer-readable instructions configured to cause the at least one processor to:

train a machine learning model using training data, the training data including a plurality of completed payment card transactions from the historical transactions database, the machine learning model being an Isolation Forest model that is configured, after the training, to determine whether an input transaction is an outlier transaction relative to a first demographic feature;

identify a first payment card transaction;

input the first payment card transaction to the trained machine learning model;

identify, as an output of the trained machine learning model, that the first payment card transaction is an outlier transaction; and generate a report identifying the first payment card transaction as an instance of discrimination, wherein generating the report further includes causing to be displayed, to a consumer via a user interface, an alert indicator identifying a merchant associated with the first payment card transaction as historically exhibiting disparate treatment in payment card transactions.

2. The analytics system of claim 1, wherein the computer-readable instructions are further configured to cause the at least one processor to:

retrieve, from the historical transactions database, a plurality of completed payment card transactions involving a first merchant; and apply each completed payment card transaction of the plurality of completed payment card transactions as input to the machine learning model, thereby generating a score for each completed payment card transaction, wherein generating the report includes:

identifying one or more anomalous transactions from the plurality of completed payment card transactions based on the scores; and reporting each anomalous transaction of the one or more anomalous transactions as exhibiting disparate impact based on a particular demographic attribute.

3. The analytics system of claim 2, wherein the computer-readable instructions are further configured to cause the at least one processor to cause to be displayed, to a consumer via a mobile user interface, a merchant certification indicator identifying the first merchant as a fair merchant when the plurality of completed payment card transactions exhibit an anomalous transaction level below a predetermined threshold.

4. The analytics system of claim 1, wherein the first payment card transaction is a pending payment card transaction awaiting approval of a consumer to proceed, wherein the report is displayed to the consumer after the consumer initiates the first payment card transaction and before a transaction request is sent to an issuer, wherein the computer-readable instructions are further configured to cause the at least one processor to:

receive, based on input from the consumer in response to the displaying of the report, a request to cancel the first payment card transaction; and terminate the first payment card transaction before submitting the first payment card transaction to the issuer for authorization.

5. The analytics system of claim 1, wherein training the machine learning model further comprises:

selecting the plurality of completed payment card transactions from the historical transactions database based on at least one criteria filter; and for each completed payment card transaction in the plurality of completed payment card transactions:

identifying a consumer associated with the completed payment card transaction; and retrieving one or more demographic attributes of the consumer.

6. The analytics system of claim 5, wherein training the machine learning model further comprises:

selecting a plurality of training features for the training, the plurality of training features including a plurality of transaction data components and at least one demographic attribute;

generating a training dataset matrix, wherein each row of the training dataset matrix represents a completed payment card transaction of the plurality of completed payment card transactions, wherein each column of the training dataset matrix represents one of the training features of the plurality of training features, wherein each cell in the training dataset matrix is populated with a value of an associated training feature and an associated completed payment card transaction; and training the machine learning model based on the training dataset matrix.

7. A computer-implemented method for identifying discrimination in payment card transactions, the method comprising:

training a machine learning model using training data, the training data including a plurality of completed payment card transactions, the machine learning model being configured to receive, as input, transaction details for an input transaction and generate, as output, an anomalous score indicating whether the input transaction is an outlier transaction relative to a first demographic feature;

identifying a first payment card transaction;

inputting the first payment card transaction to the trained machine learning model;

identifying, as an output of the trained machine learning model, that the first payment card transaction is an outlier transaction; and generating a report identifying the first payment card transaction as an instance of discrimination, causing to be displayed, to a consumer via a mobile user interface, a merchant certification indicator identifying a merchant as a fair merchant when the plurality of completed payment card transactions exhibit an anomalous transaction level below a predetermined threshold.

8. The computer-implemented method of claim 7, further comprising:

receiving a plurality of completed payment card transactions involving a first merchant; and applying each completed payment card transaction of the plurality of completed payment card transactions as input to the machine learning model, thereby generating a score for each completed payment card transaction, wherein generating the report includes:

identifying one or more anomalous transactions from the plurality of completed payment card transactions based on the scores; and reporting each anomalous transaction of the one or more anomalous transactions as exhibiting disparate impact based on a particular demographic attribute.

9. The computer-implemented method of claim 7, wherein generating the report further includes causing to be displayed, to a consumer via a user interface, an alert indicator identifying a merchant associated with the first payment card transaction as historically exhibiting disparate treatment in payment card transactions.

10. The computer-implemented method of claim 7, wherein the first payment card transaction is a pending payment card transaction awaiting approval of a consumer to proceed, wherein the report is displayed to the consumer after the consumer initiates the first payment card transaction and before a transaction request is sent to an issuer, wherein the computer-implemented method further comprises:

receiving, based on input from the consumer, a request to cancel the first payment card transaction; and terminating the first payment card transaction before submitting the first payment card transaction to the issuer for authorization.

11. The computer-implemented method of claim 7, wherein training the machine learning model further comprises:

selecting the plurality of completed payment card transactions from a historical transactions database based on at least one criteria filter; and for each completed payment card transaction in the plurality of completed payment card transactions:

identifying a consumer associated with the completed payment card transaction; and retrieving one or more demographic attributes of the consumer.

12. The computer-implemented method of claim 11, wherein training the machine learning model further comprises:

selecting a plurality of training features for the training, the plurality of training features including a plurality of transaction data components and at least one demographic attribute;

generating a training dataset matrix, wherein each row of the training dataset matrix represents a completed payment card transaction of the plurality of completed payment card transactions, wherein each column of the training dataset matrix represents one of the training features of the plurality of training features, wherein each cell in the training dataset matrix is populated with a value of an associated training feature and an associated completed payment card transaction; and training the machine learning model based on the training dataset matrix.

13. A computer storage medium having computer-executable instructions that, upon execution by a processor of a computer, cause the processor to at least:

train a machine learning model using training data, the training data including a plurality of completed payment card transactions from a historical transactions database, the machine learning model being an Isolation Forest model that is configured, after the training, to determine whether an input transaction is an outlier transaction relative to a first demographic feature;

identify a first payment card transaction;

input the first payment card transaction to the trained machine learning model;

identify, as an output of the trained machine learning model, that the first payment card transaction is an outlier transaction; and generate a report identifying the first payment card transaction as an instance of discrimination, wherein the first payment card transaction is a pending payment card transaction awaiting approval of a consumer to proceed, wherein the report is displayed to the consumer after the consumer initiates the first payment card transaction and before a transaction request is sent to an issuer, wherein the computer-executable instructions are further configured to cause the processor to:

receive, based on input from the consumer, a request to cancel the first payment card transaction; and terminate the first payment card transaction before submitting the first payment card transaction to the issuer for authorization.

14. The computer storage medium of claim 13, wherein the computer-executable instructions are further configured to cause the processor to cause to be displayed, to a consumer via a mobile user interface, a merchant certification indicator identifying a merchant as a fair merchant when the plurality of completed payment card transactions exhibit an anomalous transaction level below a predetermined threshold.

15. The computer storage medium of claim 13, wherein generating the report further includes causing to be displayed, to a consumer via a user interface, an alert indicator identifying a merchant associated with the first payment card transaction as historically exhibiting disparate treatment in payment card transactions.

16. The computer storage medium of claim 13, wherein training the machine learning model further comprises:

selecting the plurality of completed payment card transactions from the historical transactions database based on at least one criteria filter; and for each completed payment card transaction in the plurality of completed payment card transactions:

identifying a consumer associated with the completed payment card transaction; and retrieving one or more demographic attributes of the consumer.

17. The analytics system of claim 1, wherein the first demographic feature comprises one or more demographic attributes, the one or more demographic attributes comprising one or more of:

one or more direct demographic attributes comprising: race, gender, gender identity, religion, age, disability, national origin, or sexual orientation; and one or more indirect demographic attributes comprising ZIP code information or geographic information.

* * * * *